United States Patent [19]
Reber et al.

[11] Patent Number: 5,938,726
[45] Date of Patent: Aug. 17, 1999

[54] APPARATUS FOR READING AN ELECTRONIC NETWORK NAVIGATION DEVICE AND A PERIPHERAL FOR USE THEREWITH

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 08/732,956

[22] Filed: Oct. 17, 1996

[51] Int. Cl.$^6$ ..................................................... G06F 13/00
[52] U.S. Cl. ............................................................. 709/217
[58] Field of Search .................... 395/200.48, 200.56, 395/200.57, 200.58, 200.5, 200.51, 200.59, 200.53, 680; 345/333, 335, 684; 709/203, 217, 219

[56] References Cited

U.S. PATENT DOCUMENTS

| | | | |
|---|---|---|---|
| 3,818,190 | 6/1974 | Silverman et al. | 235/382 |
| 3,999,042 | 12/1976 | Silverman et al. | 235/382 |
| 4,044,227 | 8/1977 | Holm et al. | 235/437 |
| 4,841,132 | 6/1989 | Kajitani et al. | 235/472 |
| 4,937,853 | 6/1990 | Brule et al. | 463/17 |
| 5,115,326 | 5/1992 | Burgess et al. | 358/440 |
| 5,156,898 | 10/1992 | McDonald | 428/100 |
| 5,280,625 | 1/1994 | Howarter et al. | 370/316 |
| 5,308,685 | 5/1994 | Froggatt | 428/204 |
| 5,319,562 | 6/1994 | Whitehouse | 705/403 |
| 5,510,992 | 4/1996 | Kara | 705/408 |
| 5,539,870 | 7/1996 | Conrad et al. | 345/352 |
| 5,548,722 | 8/1996 | Jalalian | 709/221 |
| 5,583,940 | 12/1996 | Vidrascu et al. | 380/49 |

(List continued on next page.)

FOREIGN PATENT DOCUMENTS

| | | |
|---|---|---|
| WO97/01137 | 1/1997 | WIPO . |
| WO98/20411 | 5/1998 | WIPO . |

OTHER PUBLICATIONS

Article from the Internet: –Web TV, author Chris O'Malley, pp. 49–53.
From the Internet: –Discover the World Wide Web with Your Sportster, Second Edition, author Neil Randall.
From the Internet: –"Advertising" p. 1 of 1, and "The Anonymizer FAQ" p. 1 to 5, Copyright 1995–1996, Community ConneXion, Inc.
Marvel Comics, Tiger Barcodzz Electronic LCD Game, "X–Men", Tiger Electronics, Inc., Marvel Entertainment Group, Inc. 1994.
"AC&E BarCode Information", url:www.intrepid.net/~scanlite/pagetwo.html.
Zuckerman, "It's a New Brand of E–Mail, Companies Want to Turn Computers Into Postage Meters", *The New York Times*, Monday, Apr. 28, 1997.

*Primary Examiner*—Moustafa M. Meky
*Attorney, Agent, or Firm*—Jeffrey G. Toler; James E. Gauger

[57] ABSTRACT

An apparatus for navigating an electronic network (20) comprises a housing (240) which houses a data reader, a pointing device (236), and a transmitter. The data reader is to read at least one instruction for navigating to a resource in the electronic network (20). The pointing device (236) is to receive, upon navigating to the resource, a user-initiated action for navigating within the resource. The transmitter is to transmit a first signal associated with the at least one instruction and a second signal associated with the user-initiated action.

20 Claims, 7 Drawing Sheets

U.S. PATENT DOCUMENTS

| | | | |
|---|---|---|---|
| 5,590,197 | 12/1996 | Chen et al. | 380/24 |
| 5,602,918 | 2/1997 | Chen et al. | 380/21 |
| 5,606,507 | 2/1997 | Kara | 705/408 |
| 5,613,012 | 3/1997 | Hoffman et al. | 382/115 |
| 5,625,781 | 4/1997 | Cline et al. | 709/217 |
| 5,630,079 | 5/1997 | McLaughlin | 707/500 |
| 5,638,504 | 6/1997 | Scott et al. | 707/530 |
| 5,640,002 | 6/1997 | Ruppert et al. | 235/462.46 |
| 5,640,193 | 6/1997 | Wellner | 709/218 |
| 5,640,565 | 6/1997 | Dickinson | 395/683 |
| 5,659,164 | 8/1997 | Schmid et al. | 235/375 |
| 5,668,990 | 9/1997 | Bajorinas et al. | 707/104 |
| 5,677,955 | 10/1997 | Doggett et al. | 380/24 |
| 5,689,642 | 11/1997 | Harkins et al. | 709/229 |
| 5,692,073 | 11/1997 | Cass | 382/219 |
| 5,694,471 | 12/1997 | Chen et al. | 380/25 |
| 5,694,546 | 12/1997 | Reisman | 709/217 |
| 5,717,860 | 2/1998 | Graber et al. | 705/14 |
| 5,745,389 | 4/1998 | Russell | 380/55 |
| 5,758,216 | 5/1998 | Arnold | 396/311 |

APPARATUS FOR READING AN ELECTRONIC NETWORK NAVIGATION DEVICE AND A PERIPHERAL FOR USE THEREWITH

RELATED INVENTIONS

The present application is a continuation-in-part of the following applications which are assigned to the same assignee as the present invention:

"Electronic Network Navigation Device and Method for Linking to an Electronic Address Therewith", Ser. No. 08/710,820 filed Sep. 23, 1996, still pending; and "Methods and Systems for Providing a Resource in an Electronic Network", Ser. No. 08/726,004, filed Oct. 4, 1996, still pending.

The subject matter of the above-identified related applications is hereby incorporated by reference into the disclosure of this application.

FIELD OF THE INVENTION

The present invention relates to systems for navigating to a resource in an electronic network.

BACKGROUND OF THE INVENTION

The introductory chapter of *Discover the World Wide Web with Your Sportster*, Second Edition, provides a commentary on the present state of the Internet and the World Wide Web. In this reference it is stated that the Internet is in need of an application which will transform the "much-hyped but difficult-to-use linking of computers around the world to being a highly informative, highly usable database and communications tool." It is further stated that the various available Web browsers (e.g. Mosaic and Netscape Navigator) all have difficulties and limitations which make them insufficient to handle the complexity of the Internet.

Part of the problem is in the complexity of addressing a resource on the World Wide Web. The World Wide Web uses an addressing system known as a URL (Uniform Resource Locator) that defines the location of a resource on the Internet. URLs are comprised of up to four parts: a protocol, a domain name, a path, and a filename. The combination of these four parts can produce a complex address for a resource. For example, the address for information on two-way pagers on the Motorola home page is: http://www.mot.com/MIMS/MSPG/Products /Two-way/tango/desc.html.

Another part of the problem is in the rapid increase of the number of entities and the number of resources on the World Wide Web. Many entities are finding that domain names which they desire are already reserved. As a result, some entities have to purchase their desired domain name from another holder, or have to reserve a less than desirable domain name. Further, as the number of resources increases, newly-formed URLs become less intuitive and greater in length.

Resolving the problem of address complexity is even more important as various companies propose Internet navigation systems for the masses.

Accordingly, there is a need for improved systems for navigating to a resource in an electronic network.

BRIEF DESCRIPTION OF THE DRAWINGS

The invention is pointed out with particularity in the appended claims. However, other features of the invention will become more apparent and the invention may be best understood by referring to the following detailed description in conjunction with the accompanying drawings in which:

DETAILED DESCRIPTION OF A PREFERRED EMBODIMENT

Embodiments of the present invention advantageously provide methods and systems for automatically linking a user to a resource in an electronic network using a network navigation device. The device includes a human-viewable image intuitively associated with the resource and machine-readable data for navigating to the electronic address. A user accesses the resource by reading the machine-readable data using a data reader rather than by typing an electronic address. As a result, the addressing format and the address itself become transparent to the user. Consequently, the problem of address complexity is eliminated and the criticality of reserving desired domain names is reduced.

Additionally, an apparatus is provided which allows a user both to read a network navigation device to link to the resource, and to navigate within the resource once linked thereto. The device and the reading apparatus are well-suited for utilization by the masses to navigate to desired sites on the Internet and the World Wide Web.

Figure 1:
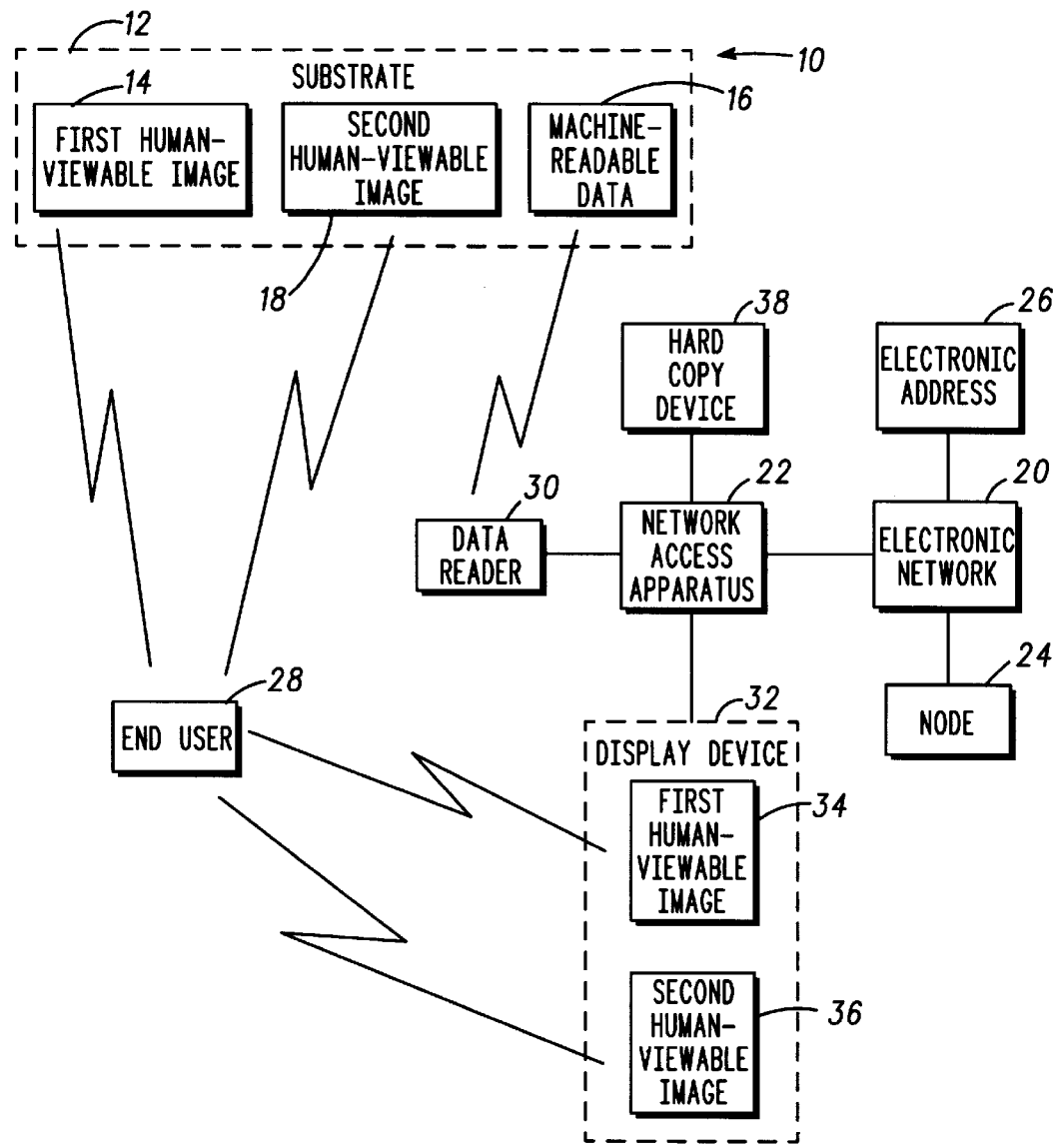
FIG. 1 is a block diagram of an embodiment of a network navigation device in accordance with the present invention.

FIG. 1 is a block diagram of an embodiment of a network navigation device 10 in accordance with the present invention. The network navigation device 10 comprises a substrate 12, a first human-viewable image 14 supported by the substrate 12, and machine-readable data 16 supported by the substrate 12. Optionally, the network navigation device further comprises a second human-viewable image 18 supported by the substrate 12.

The first human-viewable image 14 is indicative of a resource in an electronic network 20. The second human-viewable image 18 is preferably indicative of a service which provides the resource to a network access apparatus 22 via the electronic network 20. The machine-readable data 16 provides data which identifies the resource to the service.

The service which provides the resource to an end user 28 is provided by a node 24 in the electronic network 20. In general, the resource can be locally present at the node 24 or can be at another electronic address 26 in the electronic network 20. Further, the node 24 can include a mirror server to provide resources found elsewhere on the electronic network 20.

Although embodiments of the present invention can be advantageously utilized for any electronic network having an electronic addressing scheme for identifying servers and information contained therein, of particular interest are embodiments of the present invention where the electronic network 20 includes the Internet, the World Wide Web, or an intranet. Here, the machine-readable data 16 can include at least a portion of a URL or an IP (Internet Protocol) address to identify the resource. Alternatively, the machine-readable data 16 can include a code from which the node 24 identifies the resource.

Preferably, the substrate 12 is formed by a substantially flat piece of material. Examples of materials which can be utilized to form the substrate 12 include, but are not limited to, dielectric materials such as paper, cardboard, and plastic, and substantially nonmagnetic materials. Preferably, the material and its thickness are selected so that the substrate 12 is stiff, yet flexible. It is noted that, in general, the substrate 12 need not be homogeneous, i.e. more than two materials can be utilized to form the substrate 12.

It is also preferred that the substrate 12 be shaped and sized to facilitate ease in handling by individuals, such as the end user 28. For this purpose, the substrate 12 can be card-shaped. In this case, for example, the substrate 12 may be the size of a business card, a credit card, an index card, a trading card (e.g. a baseball card), or a playing card (e.g. from a deck of playing cards). In other embodiments, the substrate 12 includes a page in a book, a magazine, a newspaper, or other printed publication. In general, the substrate 12 can have various shapes, such as rectangular, circular, oval, or polygonal shapes, and can have various sizes.

It is further noted that the substrate 12 can be folded or attached to a page which is folded. As a result, the network navigation device 10 can assume two profiles: (i) an unfolded profile which provides surface areas for supporting all of the machine-readable data 16, the human-viewable images 14 and 18, and additional information; and (ii) a smaller, folded profile which provides smaller externally-accessible surfaces for supporting a subset of the above-described information.

The human-viewable images 14 and 18 can be supported by the substrate 12 in a variety of ways. In one embodiment, the human-viewable images 14 and 18 are printed directly onto the substrate 12. In another embodiment, the human-viewable images 14 and 18 are printed onto a second substrate for affixing or adhering to a surface of the substrate 12. In this case, the second substrate can have an adhesive backing for affixing the human-viewable images 14 and 18 to the substrate 12. As another alternative, the human-viewable images 14 and 18 can be contained (e.g. sandwiched) within the substrate 12.

The first human-viewable image 14 can include textual information and/or graphical information which provides an intuitive and/or understandable representation of the resource. As an example, to provide a network navigation device for the resource of the Motorola Web page on two-way pagers, the human-viewable image 14 can include textual information such as "Motorola" and/or "Two-Way Pagers", graphical information such as an image or an illustration of a Motorola two-way pager, or a combination of textual information and graphical information. Such a human-viewable image is more intuitive and more understandable to the end user 28 than an electronic address having the form of http://www.mot.com/MIMS/MSPG/Products/Two-way/tango/desc.html.

The second human-viewable image 18 can include textual information and/or graphical information which indicates to the end user 28 additional information, such as which service is providing the resource. For example, the second human-viewable image 18 can include textual information such as "Brought to you by" and the name of the service, graphical information such as a logo for the service, or a combination of textual information and graphical information.

Generally, the second human-viewable image 18 can indicate any combination of: a client routine (e.g. an Internet browser routine) which is utilized to display the resource, a network provider (e.g. an Internet service provider) which connects the network access apparatus 22 to the electronic network 20, a service which provides a link to the resource, or an advertiser.

The machine-readable data 16 can be supported by the substrate 12 in a variety of ways. In embodiments where the machine-readable data 16 includes printed data, the machine-readable data 16 can be printed directly onto the substrate 12, printed onto a second substrate for affixing or adhering to a surface of the substrate 12, or can be contained within the substrate 12. In these embodiments, the printed data can include a bar code, such as a one-dimensional or a two-dimensional bar code, representative of the navigation instructions for linking to the resource. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417.

Typically, the printed data is not readily interpretable or not readily discernible by the end user 28. For example, although a human may be specially trained to mentally decode a bar code, such a code is practically indiscernible by most humans. Further, the printed data can be either visible or invisible to the end user 28.

In embodiments where the machine-readable data 16 includes magnetically-stored data, the machine-readable data 16 can be: (i) stored directly onto a portion of the substrate 12 having a magnetic storage medium; (ii) stored onto a magnetic storage medium for affixing to the substrate 12; or (iii) stored onto a magnetic storage medium contained (e.g. sandwiched) within the substrate 12.

In embodiments where the machine-readable data 16 includes electronically-stored data, the machine-readable data 16 can be stored in a memory device integrated with the substrate 12. In these embodiments, the electronically-stored data can be externally accessed via an interface integrated with the network navigation device 10, or via a transmitter integrated with the network navigation device 10.

The machine-readable data 16 is preferably communicated to the network access apparatus 22 by a data reader 30. The form of the data reader 30 is dependent upon the form of the machine-readable data 16. For printed data, the data reader 30 can include an optical imaging reader such as a scanning wand, a linear CCD (charge coupled device) reader, or a two-dimensional CCD reader. For magnetically-stored data the data reader 30 can include a magnetic read head, such as those within a magnetic stripe reader. For electronically-stored data, the data reader 30 can include any suitable electronic interface or a receiver.

If desired, the machine-readable data 16 can be selected to be readable by more than one type of data reader 30. For example, printed data can be printed with a magnetic substance, such as magnetic ink, so as to be readable by both an optical reader and a magnetic reader.

Generally, the machine-readable data 16 can include instructions which direct the network access apparatus 24 to execute any combination of: a predetermined client routine (e.g. a predetermined Internet browser routine), a predetermined network provider access routine (e.g. dialing and logging on to a predetermined service provider), and navigation instructions for automatically linking the network access apparatus 22 to the electronic address 26 via the electronic network 20.

The network access apparatus 22 can have a variety of forms, including but not limited to, a general purpose computer, a network computer, a network television, an internet television, a portable wireless device, a television receiver, a game player, a video recorder, and an audio component. A display device 32, such as a monitor or a television, is coupled to the network access apparatus 22 to display visual content of the resource upon linking to the electronic address 26. To reinforce the intuitive association between the network navigation device 10 and the resource, a first image 34 viewable on the display device 32 upon linking to the resource is similar to (or can be equivalent to) at least a portion of the first human-viewable image 14. To reinforce the intuitive association between the network navigation device 10 and the service which provides the resource, a second image 36 viewable on the display device 32 is similar to (or can be equivalent to) at least a portion of the second human-viewable image 18.

The network access apparatus 22 can communicate with a hard copy device 38 to provide a hard copy representation of an experience provided by the network navigation device 10. The hard copy device 38 can have a variety of forms, including but not limited to, a printer, a laser printer, an ink jet printer, a thermal printer, and a plotter.

The hard copy representation allows the end user 28 to retrace his/her experience or navigation session initiated by the network navigation device 10. The hard copy representation can include at least a portion of the content from one or more resources accessed during the experience. The hard copy representation can include a plurality of images in a gallery form which summarize the experience. Alternatively, or in addition thereto, the hard copy representation can include a map which summarizes the electronic addresses visited during the experience.

If desired, the hard copy device 38 can print the hard copy representation onto the substrate 12, or onto another substrate which can be attached to the substrate 12. As a result, a souvenir of the navigation session may be physically linked to the network navigation device 10 which initiated the navigation session.

FIG. 2 and FIGS. 4 to 9 illustrate various examples of embodiments of the network navigation device 10. It is noted that the teachings herein can be interchanged and combined among the various examples to form additional embodiments.

Figure 2:
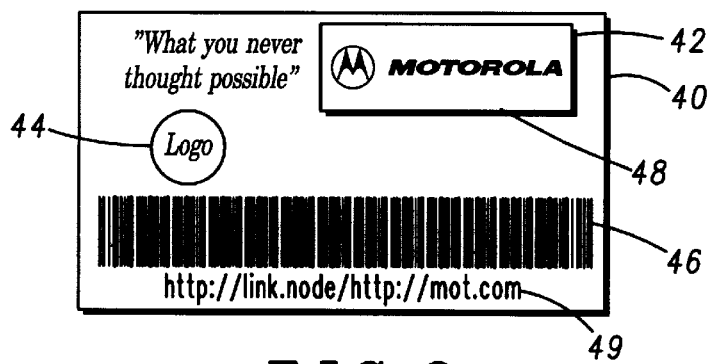
FIG. 2 is an illustration of a first embodiment of a network navigation device in accordance with the present invention.

FIG. 2 is an illustration of a first embodiment of a network navigation device in accordance with the present invention. The network navigation device includes a substrate 40 which supports a first human-viewable image 42, a second human-viewable image 44, and machine-readable data 46.

The first human-viewable image 42 includes information which indicates to an end user that the network navigation device can be utilized to link to a resource from or about Motorola, Inc. For this purpose, included in the human-viewable image 42 is textual information such as "Motorola" and the "What you never thought possible" trademark, and graphical information such as the Motorola logo 48.

The second human-viewable image 44 includes a logo which identifies a service which provides the resource to the end user 28. In this embodiment, the logo identifies a linking service provided at a node (such as the node 24 in FIG. 1) on the World Wide Web.

The machine-readable data 46 includes a bar code representation of a first URL for the node which provides the linking service (in particular, http://link.node/), and a second URL for the Motorola home page on the World Wide Web (in particular, http://mot.com). It is noted that the URL of http://link.node/ is a fictitious URL, and is utilized for purposes of illustration only. If desired, a printed, human-readable representation 49 of any of the machine-readable data 46 can be supported by the substrate 40.

The first URL provides a navigation instruction for automatically linking the network access apparatus 22 to the node 24 via the electronic network 20. The second URL is utilized to link the node 24 to the Motorola home page (for example, at the electronic address 26) via the electronic network 20. The node 24 receives content from the Motorola home page upon linking thereto and the content is transferred from the node 24 to the network access apparatus 22 via the electronic network 20.

Optionally, the content delivered to the network access apparatus 22 can be modified at the node 24 to include an image corresponding to at least a portion of the second human-viewable image 44. Here, for example, the content can be modified to include an image of the logo for the linking service.

In the embodiment illustrated in FIG. 2, the substrate 40 preferably has the size of a business card (3.5 inches by 2 inches). Preferably, the substrate 40 is formed entirely of a dielectric and/or nonmagnetic material such as paper, cardboard, or plastic. These materials are advantageous for producing a network navigation device which is inexpensive, and hence, can be disposed after use.

The human-viewable images 42 and 44 and the machine-readable data 46 can be printed directly onto the substrate 40. Alternatively, the human-viewable images 42 and 44 and the machine-readable data 46 can be printed onto a second substrate, which is thereafter affixed to the substrate 40.

Figure 3:
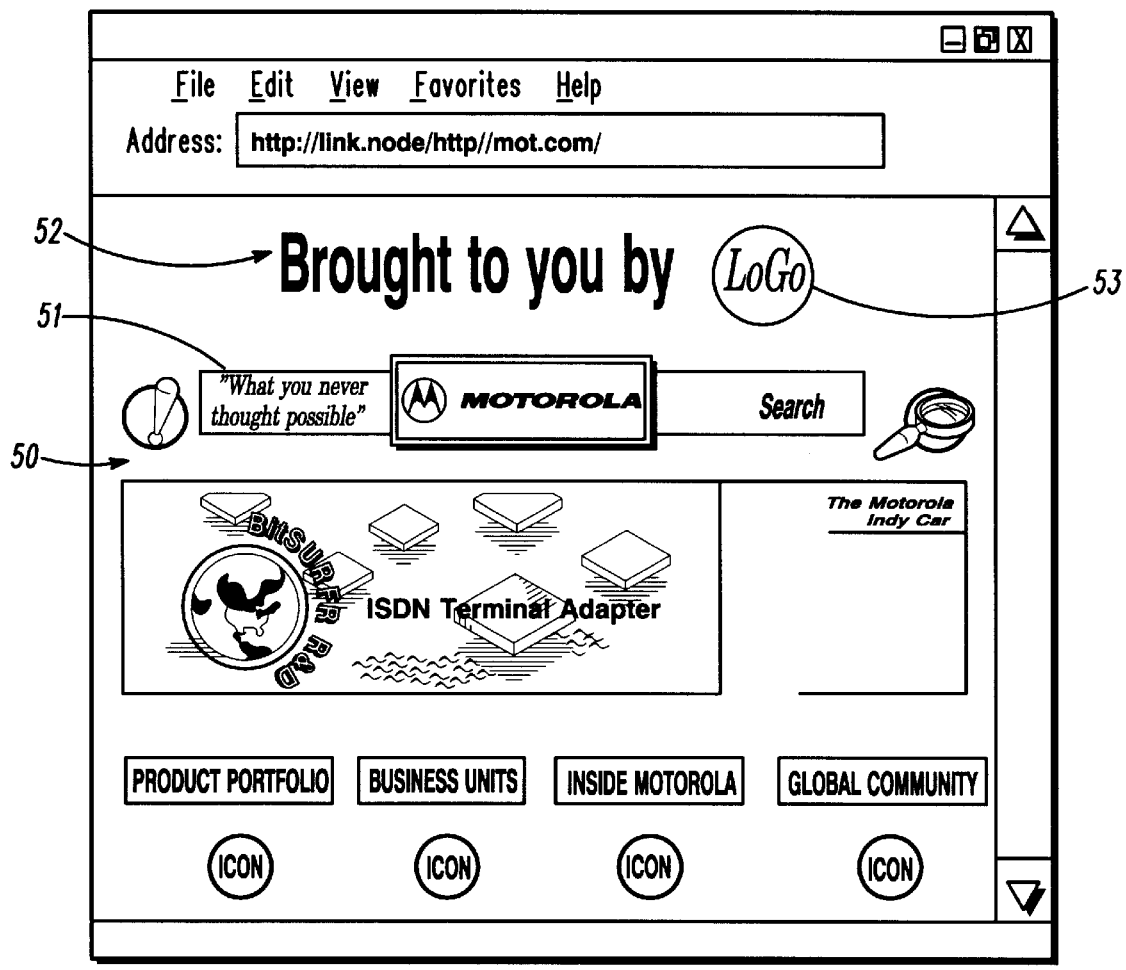
FIG. 3 is an illustration of an example display on a display device upon receiving a resource using the network navigation device of FIG. 2.

FIG. 3 is an illustration of an example display on the display device 32 upon linking to the resource using the network navigation device of FIG. 2. The display includes content 50 from the resource, which includes an image 51 corresponding to the first human-viewable image 42. The display further includes content 52 added by the linking service. The content 52 includes an image 53 corresponding to the second human-viewable image 44.

Figure 4:
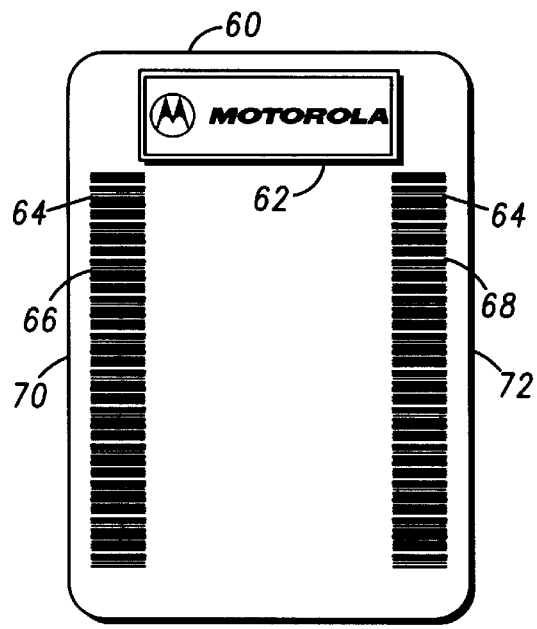
FIG. 4 is an illustration of a second embodiment of a network navigation device in accordance with the present invention.

FIG. 4 is an illustration of a second embodiment of a network navigation device in accordance with the present invention. The network navigation device includes a substrate 60 which supports a human-viewable image 62 to indicate to an end user that the network navigation device can be utilized to link to a resource from or about Motorola, Inc. The substrate 60 further supports machine-readable data 64 in the form of a first bar code representation 66 and a second bar code representation 68 of a URL for the Motorola home page (in particular, http://mot.com).

The first bar code representation 66 and the second bar code representation 68 are disposed on different portions of the substrate 60. Preferably, the first bar code representation 66 is aligned with and located proximate to a first edge 70 of the substrate 60, while the second bar code representation 68 is aligned with and located proximate to a second edge 72 of the substrate 60.

As a result, the end user can grasp the network navigation device from either of two sides without obstructing at least one of the first bar code representation 66 and the second bar code representation 68. Further, by disposing the human-viewable image 62 in a natural viewing orientation on the substrate 60, the end user can view an indication of the resource while grasping the network navigation device from either of the two sides. Hence, this embodiment of the network navigation device is amenable for both right-handed and left-handed use by the end user.

In the embodiment illustrated in FIG. 4, the substrate 60 has the size of a playing card (2.5 inches by 3.5 inches). The substrate 60 is preferably formed of a dielectric material and/or a nonmagnetic material such as paper, cordboard, or plastic.

Figure 5:
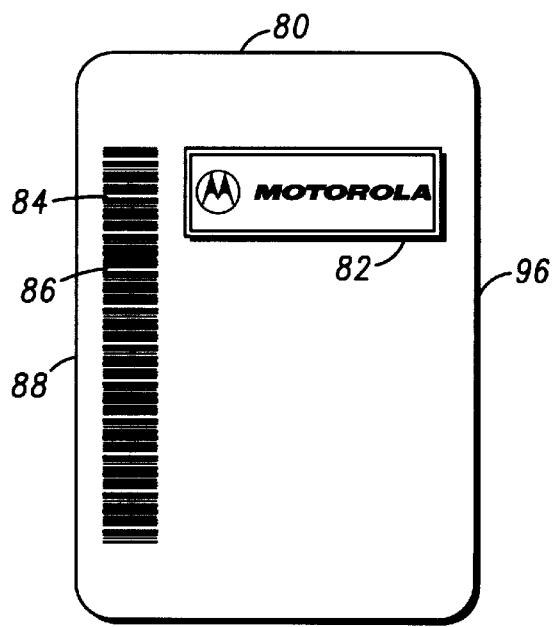
FIG. 5 is an illustration of one surface of a third embodiment of a network navigation device in accordance with the present invention.

FIG. 5 is an illustration of one surface of a third embodiment of a network navigation device in accordance with the present invention. The network navigation device includes a substrate 80 which supports a human-viewable image 82 indicating that the network navigation device can be utilized to link to a resource associated with Motorola, Inc. The substrate 80 further supports machine-readable data 84 in the form of a first bar code representation 86 of a URL for the Motorola home page (in particular, http://mot.com). The first bar code representation 86 is aligned with and located proximate to an edge 88 of the substrate 80.

Figure 6:
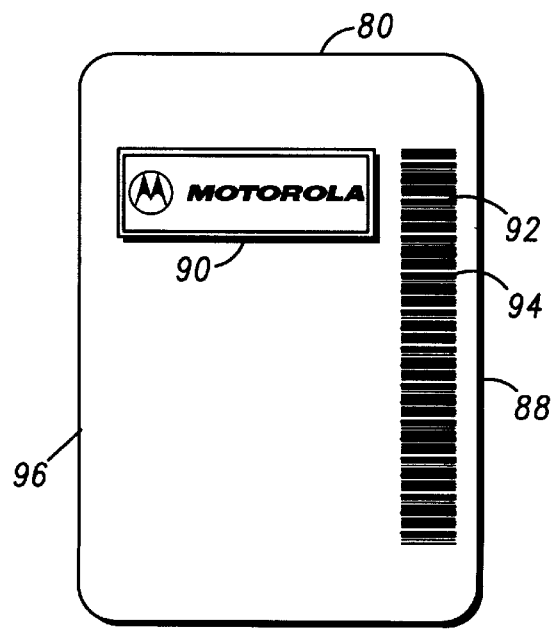
FIG. 6 is an illustration of an opposing surface of the third embodiment of the network navigation device.

FIG. 6 is an illustration of an opposing surface of the third embodiment of the network navigation device. At the opposing surface, the substrate 80 supports a human-viewable image 90 which, preferably, is the same as the human-viewable image 82. The substrate 80 further supports machine-readable data 92 in the form of a second bar code representation 94 of the URL for the Motorola home page. Preferably, the first bar code representation 86 and the second bar code representation 94 are identical. The second bar code representation 94 is aligned with and located proximate to the edge 88 of the substrate 80.

As a result, the end user can grasp the network navigation device of FIGS. 5 and 6 from a side 96 without obstructing at least one of the first bar code representation 66 and the second bar code representation 68. Hence, this embodiment of the network navigation device is amenable for both right-handed use, using one surface, and left-handed use, using the opposing surface.

In the embodiment illustrated in FIGS. 5 and 6, the substrate 80 has the size of a playing card (2.5 inches by 3.5 inches). The substrate 80 is preferably formed of a dielectric material and/or a nonmagnetic material such as paper, cardboard, or plastic.

The use of a printed image and printed data on a paper, cardboard or plastic substrate, such as in FIGS. 2, 4, 5, and 6, provides a number of advantages. A first advantage is that the resulting network navigation device can be produced inexpensively for wide distribution. For example, these network navigation devices can be: (i) included as inserts in magazines, newspapers, or other publications; (ii) stacked into decks and packaged for distribution by mail or for marketing in stores; and/or (iii) distributed as one distributes business cards. A second advantage is that a user can rapidly thumb through a number of network navigation devices to find network resources of interest by viewing the image on each network navigation device. In addition, the network navigation devices can be collected and traded in a manner similar to trading cards.

In addition, the use of a printed image and printed data allows for network navigation devices to be formed on pages of a book, magazine, newspaper, or other publication. In general, each page can define a single network navigation device, or can define a plurality of network navigation devices. If desired, a page defining a plurality of network navigation devices can be perforated to allow for separation into individual network navigation devices.

In one application, the printed image can include a figure in a book or the like. Here, the printed data may be utilized to link to a resource having information associated with the figure. If desired, the printed data can be included in a caption for the figure. In another application, a plurality of pages of network navigation devices are assembled to form a directory of resources in an electronic network.

Further, the use of a printed image and printed data allows for network navigation devices to be formed on packages, boxes, containers, and the like. Here, for example, a network navigation can be formed on a surface of a cereal box.

Although the embodiments of FIGS. 2, 4, 5, and 6 illustrate a single printed code on the network navigation device, it is noted that separate printed codes can be utilized for each of the various types of information stored on a network navigation device.

Figure 7:
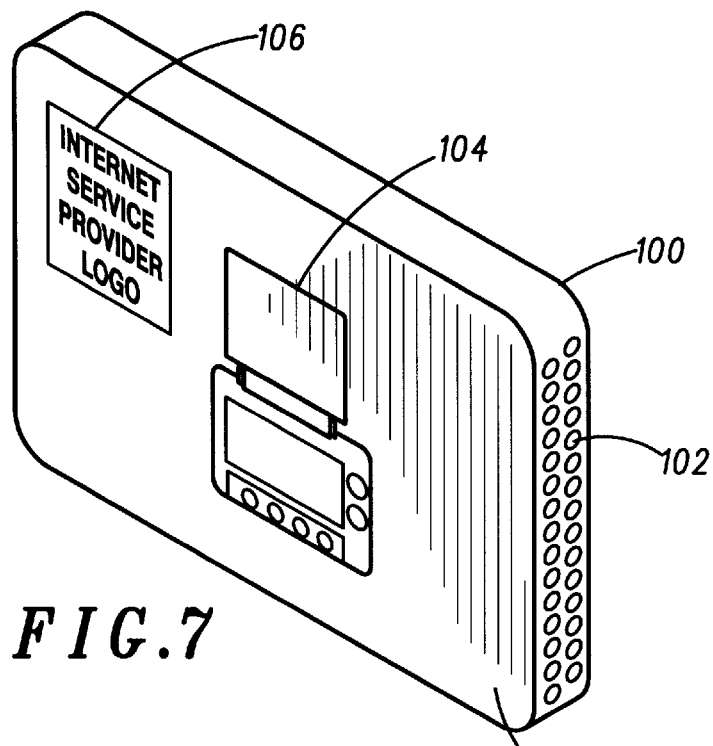
FIG. 7 illustrates a fourth embodiment of a network navigation device in accordance with the present invention.

FIG. 7 illustrates a fourth embodiment of a network navigation device in accordance with the present invention. The network navigation device includes a PCMCIA memory card 100 having stored therein machine-readable data representative of navigation instructions for linking to a resource. The PCMCIA memory card 100 has a PCMCIA interface 102 for communicating the machine-readable data to a data reader with a mating PCMCIA interface.

The PCMCIA memory card 100 supports a first externally-viewable image 104 and a second externally-viewable image 106 at an exterior surface 108. Hence, the substrate as described earlier includes a portion of the housing of the PCMCIA memory card 100.

In this example, the first externally-viewable image 104 includes an image of a Tango™ two-way pager available from Motorola. The second externally-viewable image 106 includes a logo of a service provider, such as an internet service provider, through which access to the electronic network 20 is provided.

The machine-readable data includes instructions for connecting to the internet service provider. The instructions for connecting can include, for example, a telecommunication number (such as a phone number) which is to be dialed to access the internet service provider. The machine-readable data can further include a code, such as a password, for authentication by the internet service provider. Based upon the code, access to the resource is either allowed, limited, or inhibited. Further, the code can be utilized by the internet service provider to uniquely identify the network navigation device.

In addition, the machine-readable data includes a representation of the URL for the resource providing information on the Tango™ two-way pager on the World Wide Web, which is http://www.mot.com/ MIMS/MSPG/Products/Two-way/tango/. The internet service provider utilizes the URL to link the end user 28 to the resource to receive information on the Tango™ two-way pager.

Figure 8:
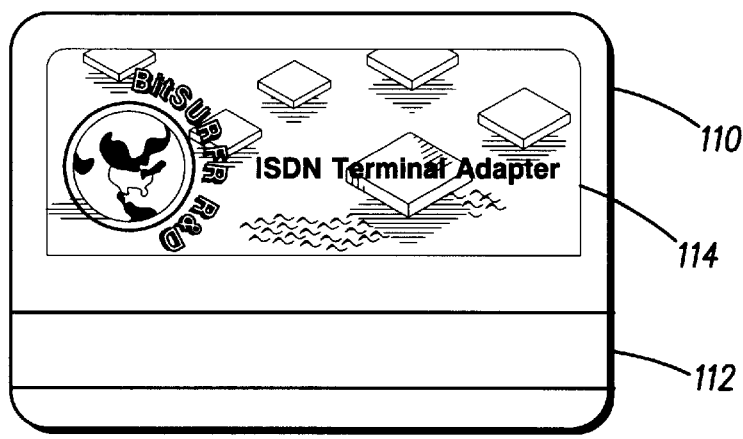
FIG. 8 illustrates a fifth embodiment of a network navigation device in accordance with the present invention.

FIG. 8 illustrates a fifth embodiment of a network navigation device in accordance with the present invention. The network navigation device includes a substrate 110 which supports a magnetic storage medium 112. In the example of FIG. 8, the magnetic storage medium 112 has the form of a magnetic stripe, although alternative forms can be utilized. The magnetic storage medium 112 stores machine-readable data providing navigation instructions for linking to a resource. The machine-readable data may be communicated to a data reader having a magnetic reading head, such as a magnetic stripe reader.

The substrate 110 supports a human-viewable image 114 indicative of a particular resource such as the resource for Motorola's BitSURFR™ modems. In the particular example of FIG. 8, the magnetic storage medium 112 stores a representation of the URL for obtaining information on Motorola's BitSURFR™ modems, which is http://www.mot.com/ MIMS/ISG/Products/bitsurfr_pro/.

In the embodiment illustrated in FIG. 8, the substrate 110 preferably has the size of a credit card (3.375 inches by 2.25 inches). Preferably, the substrate 110 is formed of a dielectric and/or nonmagnetic material such as paper, cardboard, or plastic.

Figure 9:
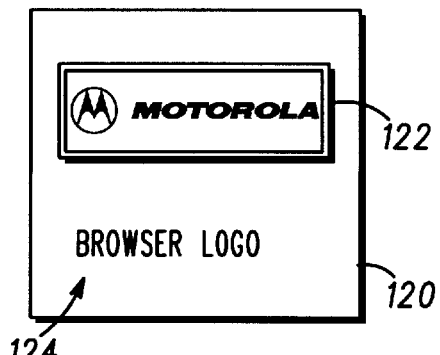
FIG. 9 illustrates a sixth embodiment of a network navigation device in accordance with the present invention.

FIG. 9 illustrates a sixth embodiment of a network navigation device in accordance with the present invention. The network navigation device includes a radio frequency tag 120 containing navigation instructions for accessing a resource. The radio frequency tag 120 includes a memory containing data representative of the navigation instructions, and a transmitter which transmits a signal representative of the data for external reception. The memory can be either read-only or read-write. In general, the radio frequency tag 120 can be either active (i.e. having an internal battery for powering its circuits) or passive (i.e. powering its circuits using externally-generated power).

Various commercially-available radio frequency tags can be utilized for the radio frequency tag 120, including but not limited to, tags produced by Indala Corporation and the MicroStamp RIC (Remote Intelligent Communication) tags available from Micron Communications, Inc. Illustrated in FIG. 9 is a network navigation device based on the MicroStamp RIC unit, which is postage-stamp sized (1.25 inches by 1.25 inches).

A human-viewable image 122 is supported by an exterior surface of a substrate of the radio frequency tag 120. The substrate, such as substrates made from materials as described above, may be used to form at least a portion of a housing for the radio frequency tag 120. In this example, the human-viewable image 122 includes the Motorola logo, which indicates that the navigation instructions will link a user to a resource which provides information relating to Motorola, Inc.

In this embodiment, the machine-readable data includes an electronic address for linking to a node (such as the node 24 in FIG. 1), and a code which identifies the resource to the node. The code may be utilized so that the electronic address for the resource is concealed from end users. The node converts the code to an electronic address for the resource, links to the electronic address, and communicates content from the resource to the end user 28.

The machine-readable data further includes an instruction set which initiates the execution of a predetermined Web browser for displaying the content of the resource. A logo for the predetermined Web browser is included in a second human-viewable image 124 supported by the exterior surface of the radio frequency tag 120.

Figure 10:
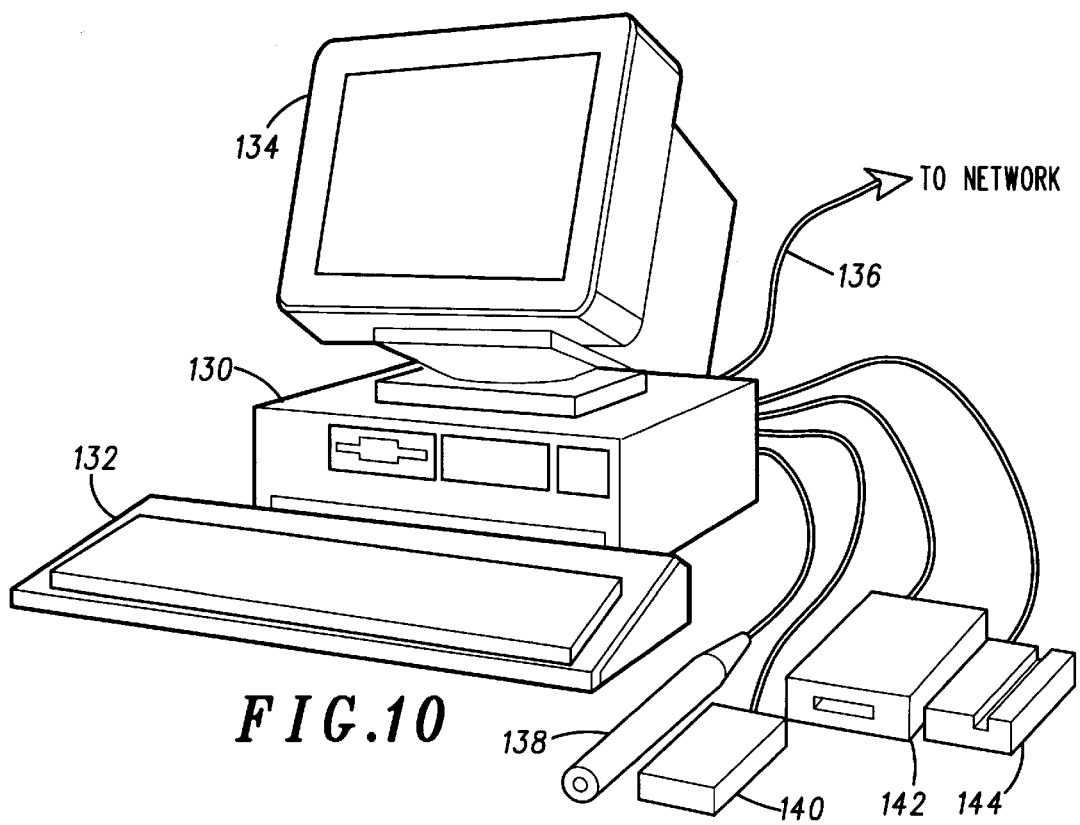
FIG. 10 illustrates an example of a network access apparatus and examples of various data readers for reading machine-readable data from a network navigation device.

FIG. 10 illustrates an example of a network access apparatus and examples of various data readers for reading machine-readable data from a network navigation device. In this example, the network access apparatus includes a personal computer 130 having an input interface, such as a keyboard 132, and a display device, such as a monitor 134, coupled thereto.

The personal computer 130 communicates with an electronic network, such as electronic network 20, via a line 136, which can include a telephone line, an ISDN line, a coaxial line, a cable television line, a fiber optic line, a computer network line, or the like. Alternatively, the personal computer 130 can wirelessly communicate with the electronic network. Based on the mode of communication with the electronic network, the personal computer 130 can include a modem and/or a transceiver to communicate with the electronic network. The electronic network can be provided by an online service, an Internet service provider, a local area network service, a wide area network service, a cable television service, a wireless data service, an intranet, or the like.

The various data readers coupled to the personal computer 130 include a bar code reader 138, an RF tag reader 140, a PCMCIA card reader 142, and a magnetic stripe reader 144. The bar code reader 138 is utilized to read bar-coded navigation instructions from a network navigation device, such as those illustrated in FIGS. 2, and 4–9. The RF tag reader 140 is utilized to receive and decode an electromagnetic signal representative of navigation instructions generated by an RF tag, such as one illustrated in FIG. 9. The PCMCIA card reader 142 interfaces with a PCMCIA card, such as the one illustrated in FIG. 7, to read navigation instructions stored therein. The magnetic stripe reader 144 reads magnetically-stored navigation instructions stored by a magnetic stripe, such as the one illustrated in FIG. 8.

It is noted that the bar code reader 138 is illustrative of any optical reading device which can be utilized. Similarly, the PCMCIA card reader 142 is illustrative of any memory card reader which can be utilized, and the magnetic stripe reader 144 is illustrative of any magnetic reading device which can be utilized.

Figure 11:
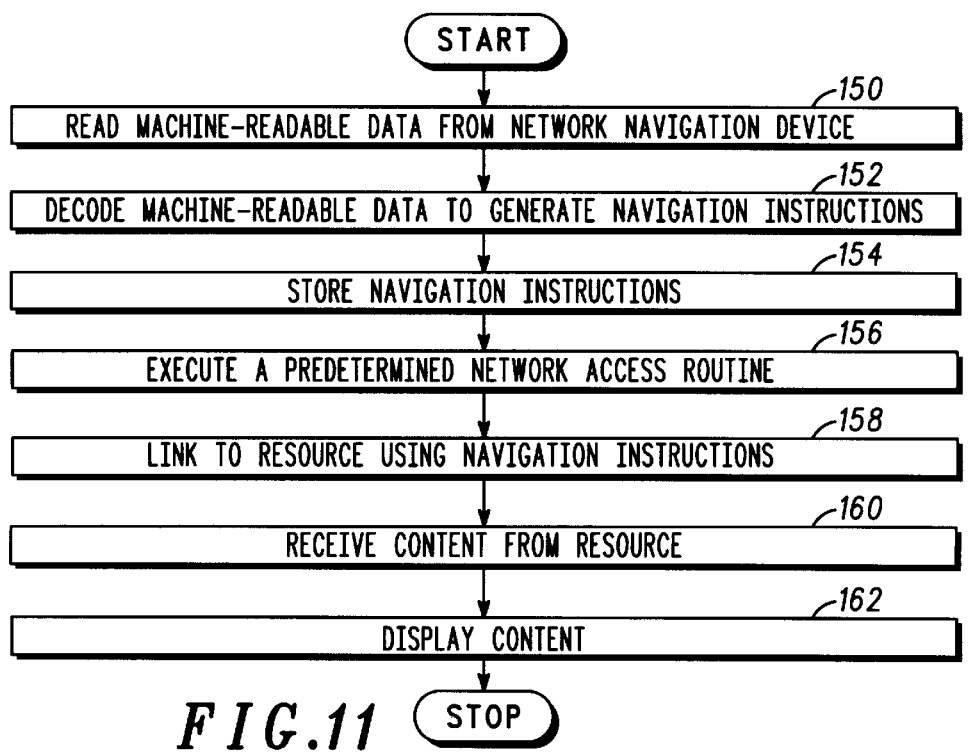
FIG. 11 is a flow chart of an embodiment of a method of linking to an electronic address in an electronic network.

FIG. 11 is a flow chart of an embodiment of a method of linking to a resource in an electronic network. The method can be utilized by the network access apparatus 22 in FIG. 1 to automatically link the end user 28 to a resource identified by data stored on the network navigation device 10. Typically, the end user 28 selects a desired resource to visit based upon the first human-viewable image 14 associated therewith on the network navigation device 10.

As indicated by block 150, the method includes a step of reading machine-readable data from a network navigation device. The machine-readable data can be read using the data reader 30, or embodiments of a reading apparatus subsequently described with reference to FIGS. 12 to 14. The specific type of data reader utilized is selected based upon how the machine-readable data is stored on the network navigation device.

As indicated by block 152, a step of decoding the machine-readable data is performed to generate navigation instructions. The navigation instructions inform the network access apparatus 22 how to link to the resource. As described earlier, the navigation instructions can include at least a portion of a URL or at least a portion of an IP address for the resource. If a partial address is received, an additional step of completing the electronic address can be performed. For example, if an IP address is received, the IP address can be prepended by "http://".

It is noted that a URL can includes up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, network navigation devices in accordance with the present invention can be utilized for automatically initiating any of the above tasks.

Optionally, a step of storing the navigation instructions is performed as indicated by block 154. The navigation instructions can be stored as a bookmark or stored in a favorites list, such as those available in many Web browsers, to provide a shortcut to the electronic address. Thereafter, a user can link to the resource by selecting the shortcut rather than having to re-read the navigation instructions from the network navigation device.

Optionally, a representation of the first human-viewable image 14 is stored to provide an iconic representation for the shortcut to the resource. As a result, the association between the first human-viewable image 14 and the resource is reinforced. Similarly, a representation of the second human-viewable image 18 can be stored for display with the iconic representation. This further reinforces the association between the second human-viewable image 18 and the service which provided the link to the resource.

To facilitate storing a representation of the human-viewable images 14 and 18, the machine-readable data can include machine-readable data representative of the human-viewable images 14 and 18, which is read in block 150. Alternatively, the human-viewable images 14 and 18 can be optically scanned into the network access apparatus 22 using a page scanner or the like. As another alternative, an electronic representation of the first human-viewable image 14 can be downloaded from the resource, and an electronic representation of the second human-viewable image 18 can be downloaded from the service upon linking thereto.

As indicated by block 156, a step of executing a predetermined network access routine is performed. The step of executing the predetermined network access routine can include any of: (i) executing a routine to connect and/or to logon to a service provider (e.g. executing a dial-up routine or a wireless authentication routine to connect to a service provider); and (ii) executing a client routine for subsequent user interaction with the electronic address (e.g. executing a graphical user interface routine or a Web browsing routine).

The step of executing the predetermined network access routine can be executed prior to reading the machine-readable data in block 150. Alternatively, the predetermined network access routine can be automatically initiated upon reading the machine-readable data in block 110. Here, the machine-readable data 16 can include instructions for directing the initiation of the predetermined network access routine, and for directing which predetermined network access routine is to be executed.

In particular, the machine-readable data 16 can include instructions for directing the type and the specifics of the connection to be made to the electronic network 20. These instructions can dictate whether a wireline connection or a wireless connection should be made, and/or which wireline connection or which wireless connection should be made. As a result, the instructions on one network navigation device may direct a connection to a first service provider (e.g. America Online) while the instructions on another network navigation device direct a connection to a second service provider (e.g. CompuServe).

Further, the machine-readable data 16 can include instructions for selecting which client routine is to be executed. As a result, the instructions on one network navigation device may direct that a first graphical user interface routine (e.g. Netscape Navigator) be executed, while the instructions on another network navigation device direct a that second graphical user interface routine (e.g. Microsoft Internet Explorer) be executed.

As indicated by block 158, the method includes a step of linking to the resource using the navigation instructions. This step typically includes transmitting the navigation instructions to the electronic network 20 to establish the link to the resource.

As indicated by block 160, the method includes a step of receiving content from resource once the link is established. The content from the resource can include audible information and/or visual information, such as graphical information and/or textual information. Examples of content include, but are not limited to, any combination of a file from a local hard drive, a file from a FTP server, an HTML document, content from a Gopher server, a message from a newsgroup, a transmission from a Telnet session, a transmission from a WAIS server, an animation file, a movie file, an audio file, downloadable software, and an electronic book file.

The content can also have the form of a videotelephone call with an individual. Here, for example, the first human-viewable image 14 can include a picture and/or a name of the individual, and the machine-readable data can include a telecommunication number or an electronic address for communicating with the individual.

As indicated by block 162, the method includes a step of displaying the content from the resource. As described earlier, the content can include an image which corresponds to at least a portion of the first human-viewable image 14 on the network navigation device 10. Additionally, the content can include an image which corresponds to at least a portion of the second human-viewable image 18.

An article of manufacture can be formed to direct a network access apparatus to perform the above-described steps. The article of manufacture can include a computer-readable storage medium having computer-readable data stored therein which directs the network access apparatus to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 12:
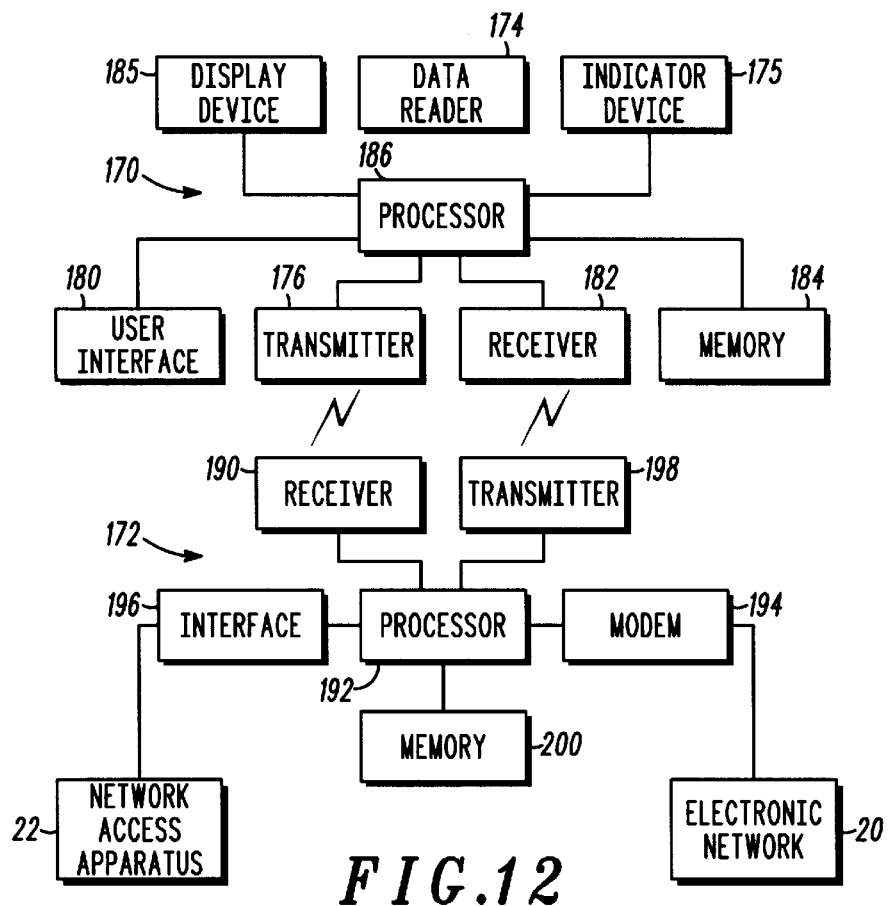
FIG. 12 is a block diagram of an embodiment of a system for communicating the machine-readable data from a network navigation device to the network access apparatus and/or to the electronic network.

FIG. 12 is a block diagram of an embodiment of a system for communicating the machine-readable data from a network navigation device to the network access apparatus 22 and/or to the electronic network 20. The system includes an apparatus 170 for reading the network navigation device, and a peripheral 172 of the network access apparatus 22 which communicates with the apparatus 170.

The apparatus 170 includes a data reader 174 which reads the machine-readable data from the network navigation device. The form of the data reader 174 is dependent upon the form of the machine-readable data. For printed data, the data reader 174 can include an optical imaging reader, a scanning-beam reader, a linear CCD (charge coupled device) reader, or a two-dimensional CCD reader. For magnetically-stored data, the data reader 174 can include a magnetic read head, such as in the form of a magnetic stripe reader. For electronically-stored data, the data reader 174 can include any suitable electronic interface or a receiver.

Optionally, the apparatus 170 includes an indicator device 175 which indicates to the end user that the machine-readable data has been successfully read by the data reader 174. The indicator device 175 can produce either an audible indication or a visual indication to provide this indication.

The apparatus 170 further includes a transmitter 176 in communication with the data reader 174 to transmit a first signal associated with the machine-readable data. Preferably, the transmitter 176 provides a wireless transmission of the first signal in the form of an electromagnetic signal, a light signal, or an acoustic pressure signal for reception by the peripheral 172. Examples of the transmitter 176 include, but are not limited to, a radio frequency transmitter, an infrared transmitter, and an ultrasonic transmitter.

The apparatus 170 further includes a user interface 180 to receive user-initiated actions for navigating within the resource. To receive various types of user-initiated actions, the user interface 180 can include a series of buttons, such as a keypad, a clicking device, a touchscreen, and/or other control buttons, and/or a pointing device such as a touchpad, a trackball, or a mouse. The user interface 180 communicates with the transmitter 176 to transmit a second signal associated with the user-initiated action.

The user interface 180 is further operative to receive a second user-initiated action for activating the data reader 174. Here, it is preferred that the user interface 180 includes a switching device which receives the second user-initiated action. In an exemplary embodiment, the switching device supports a pointing device used for navigating within the resource. Here, an end user can activate the data reader 174 by applying a sufficient force to the pointing device to depress the switching device. The end user can navigate within the resource without activating the data reader 174 by manipulating the pointing device with a lesser force.

The transmitter 176 transmits the first signal associated with the machine-readable data either: (i) automatically upon reading the machine-readable data; (ii) upon receiving another user-initiated action from the user interface 180; or (iii) in response to receiving a signal by a receiver 182 which is optionally included in the apparatus 170. Preferably, the receiver 182 receives a wireless transmission of the signal in the form of either an electromagnetic signal, a light signal, or an acoustic pressure signal. Preferred examples of the receiver 182 include, but are not limited to, a radio frequency receiver, an infrared receiver, and an ultrasonic receiver.

The apparatus 170 can include a memory 184 for storing the machine-readable data read by the data reader 174. If desired, the memory 184 can be utilized to simultaneously store machine-readable data from a plurality of network navigation devices. Once commanded, the transmitter 176 transmits a signal to download the machine-readable data stored in the memory 184.

Optionally, the apparatus 170 includes a display device 185 to display the machine-readable data stored in the memory 184. Here, the display device 185 can display a representation for each of the plurality of network navigation devices having data stored in the memory 184. The representations can be displayed in a list, for example. Using the user interface 180, the end user can select at least one of the plurality of network navigation devices in the memory 184 whose machine-readable data is to be downloaded using the transmitter 176. The display device 185 can be embodied by a liquid crystal display, for example, although other types of displays can also be utilized.

In a preferred embodiment, the data reader 174, the indicator device 175, the transmitter 176, the user interface 180, the receiver 182, the memory 184, and the display device 185 communicate and are controlled by a processor 186. In general, the processor 186 can have either an analog or a digital implementation. Preferably, the processor 186 directs the operation of the components in the apparatus 170 using a logic circuit which can include a general purpose integrated circuit, an application-specific integrated circuit, a programmable logic array, or a microprocessor.

In addition to reading machine-readable data for linking to a resource and accepting user-initiated actions for navigating within the resource, it is further preferred that the apparatus 170 be capable of operating as a remote controller for one or more appliances (which can include the network access apparatus 22). Examples of appliances which can be controlled by the apparatus 170 include, but are not limited to, a television receiver, a video recorder, an audio system, a radio receiver, a CD player, a personal computer, and a game player.

To operate as a remote controller, the user interface 180 includes a series of buttons or the like to receive user-initiated actions for controlling the appliance. The series of buttons can be formed by either hardware buttons or "soft" buttons which are formed by portions of a touchscreen. These buttons can serve either solely for remote controller functions, or for both remote controller and network navigation device functions.

The processor 186 converts each remote control command received by the user interface 180 to a respective signal compatible with a remote control receiver in the appliance. If desired, the processor 186 can be capable of providing compatibility with a number of remote control receivers, thus allowing the apparatus 170 to function as a universal remote controller.

After converting the remote control command to a respective signal, the processor 186 commands the transmitter 176 to transmit the respective signal for reception by the remote control receiver in the appliance.

Turning now to the peripheral 172, a receiver 190 receives from the apparatus 170 the first signal associated with machine-readable data read from the network navigation device. Typically, the first signal includes at least one instruction for linking the network access apparatus 22 with a resource in an electronic network 20. As described earlier, the at least one instruction can include an electronic address of the resource, at least a portion of a URL associated with the resource, or at least a portion of an IP address associated with the resource, for example. The at least one instruction can further include an instruction for selecting a client routine to be executed by the network access apparatus 22, an instruction for selecting a predetermined network provider access routine, and other instructions described herein.

Preferably, the receiver 190 receives a wireless transmission of the first signal in the form of either an electromagnetic signal, a light signal, or an acoustic pressure signal. Preferred examples of the receiver 190 include, but are not limited to, a radio frequency receiver, an infrared receiver, and an ultrasonic receiver.

The peripheral 172 includes a processor 192 operatively associated with the receiver 190 to direct each of the at least one instruction to at least one of the network access apparatus 22 and the electronic network 20. The at least one instruction can then be utilized by the network access apparatus 22 and/or the electronic network 20 to link the network access apparatus 22 with the resource.

The at least one instruction can include a first instruction and a second instruction, wherein the processor 192 directs the first instruction only to the network access apparatus 22, and wherein the processor 192 directs the second instruction only to the electronic network 20. For example, the processor 192 can direct an instruction for selecting a client routine to the network access apparatus 22 and not to the electronic network 20. Further, the processor 192 can direct an authentication code to the electronic network 20 and not to the network access apparatus 22.

The receiver 190 can further receive a second signal associated with a user-initiated instruction for navigating within the resource. Here, the processor 192 directs the user-initiated instruction to at least one of the network access apparatus 22 and the electronic network 20.

The peripheral 172 can further include a modem 194 in communication with the processor 192 to communicate each of the at least one instruction directed to the electronic network 20. The modem 194 further serves to receive content of the resource from the electronic network 20 for communication to the network access apparatus 22. Examples of the modem 194 include, but are not limited to, a telephone modem, an ISDN modem, a cable modem, and a wireless modem.

In the case where the first signal includes a telecommunication number to access the electronic network 20, the processor 192 can direct the modem 194 to dial the telecommunication number. Here, if desired, the processor 192 can inhibit directing the telecommunication number to the network access apparatus 22 and/or to the electronic network 20.

Optionally, the processor 192 is operative to delay the retrieval of the content of the resource until a predetermined time. The predetermined time can be set using the user interface 180 or the network access apparatus 22. One approach to delaying the retrieval of the content includes the processor 192 delaying the direction of data received by the receiver 190 to the network access apparatus 22, the electronic network 20, and/or the modem 194, until the predetermined time.

The peripheral 172 further comprises an interface 196 which mates with a port of the network access apparatus 22 to communicate therewith. The form of the interface 196 is dependent upon the type of network access apparatus 22 utilized and the form of the ports provided by the network access apparatus 22. For example, where the network access apparatus 22 includes a computer, the interface 196 can include any of: (i) a serial interface for mating with a serial port; (ii) a parallel interface for mating with a parallel port; (iii) a SCSI interface for mating with a SCSI port; (iv) a card for mating with an expansion slot in the computer; and (v) a PCMCIA interface for mating in a PCMCIA slot. Where the network access apparatus 22 includes a television receiver, the interface 196 can include: (i) an RF jack or plug; or (ii) audio/video jacks or plugs. Examples include, but are not limited to: (i) a coaxial cable connector; (ii) a pair of terminals to connect to a twin-lead line; (iii) a miniplug or jack therefor; and (iv) an RCA connector.

The peripheral 172 communicates with the network access apparatus 22 via the interface 196. Preferably, the interface 196 provides each of the at least one instruction directed to the network access apparatus 22 by the processor 192.

The interface 196 is further utilized to communicate signals between the network access apparatus 22 and the electronic network 20. For example, the content of the resource associated with the network navigation device is provided to the network access apparatus 22 via the interface 196. Further, selected commands for navigating within the resource (e.g. point and click commands), which are generated by the network access apparatus 22, are received by the interface 196. These commands are communicated to the modem 194 for transmission to the electronic network 20.

Optionally, the peripheral 172 further includes a transmitter 198 which transmits a second signal to the apparatus 170 to initiate a remote transmission of the first signal. The processor 192 can direct the transmitter 198 to transmit the second signal in response to a command received from either the network access apparatus 22 or the electronic network 20. Alternatively, the processor 192 can autonomously direct the transmitter 198 to transmit the second signal at predetermined times. Here, for example, the transmitter 198 transmits the second signal after a predetermined time interval has elapsed since a previous transmission.

Preferably, the transmitter 198 provides a wireless transmission of the second signal in the form of an electromagnetic signal, a light signal, or an acoustic pressure signal for reception by the receiver 182. Examples of the transmitter 198 include, but are not limited to, a radio frequency transmitter, an infrared transmitter, and an ultrasonic transmitter.

As another option, the peripheral 172 can further include a memory 200 operatively associated with the processor 192. The memory 200 is utilized for storing the data received by the receiver 190 before the data is directed to either the network access apparatus 22, the electronic network 20, or the modem 194.

To provide the above-described logic for the peripheral 172, the processor 192 can have either an analog or a digital implementation. Preferably, the processor 192 directs the operation of the components in the peripheral 172 using a logic circuit which can include a general purpose integrated circuit, an application-specific integrated circuit, a programmable logic array, or a microprocessor.

The above-described peripheral 172 can have any of a variety of forms. These forms include, but are not limited to: (i) a plug-in card for an expansion slot in a computer; (ii) an external peripheral for a computer; (iii) a PCMCIA card; (iv) a peripheral for a television receiver, such as a set-top box; (v) a circuit integrated into a television receiver; (vi) a circuit integrated with a video recorder; (vii) a circuit integrated in an Internet television; (viii) a circuit integrated in an audio receiver; and (ix) a cartridge for a game player.

Figure 13:
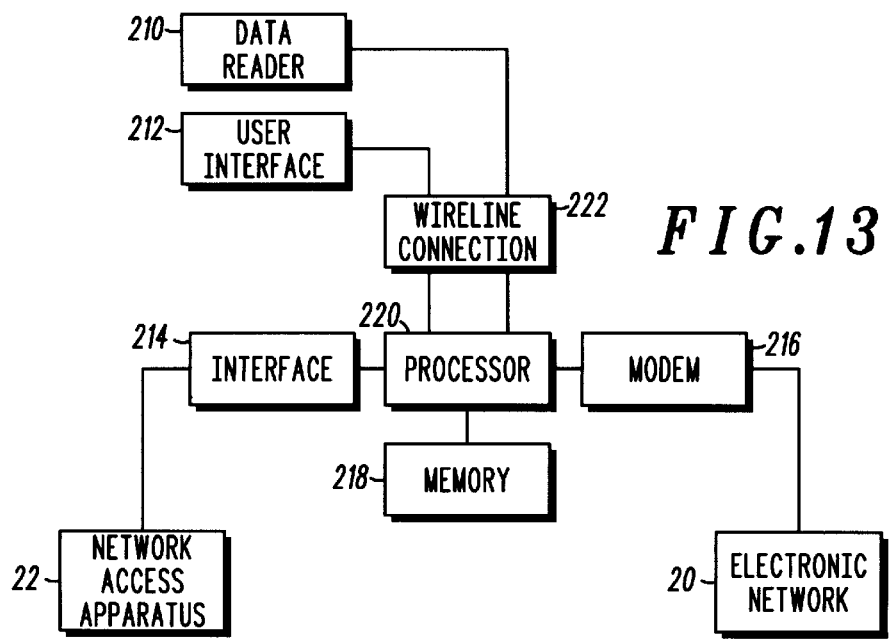
FIG. 13 is a block diagram of another embodiment of a system for communicating the machine-readable data from a network navigation device to the network access apparatus and/or to the electronic network.

FIG. 13 is a block diagram of another embodiment of a system for communicating machine-readable data from a network navigation device to the network access apparatus 22 and/or to the electronic network 20. This embodiment utilizes a data reader 210, a user interface 212, an interface 214, a modem 216, and a memory 218, such as the data reader 174, user interface 180, interface 196, modem 194, and memories 184 and 200 described in FIG. 12. A processor 220 provides communication between and control of these components in accordance with any of the logic provided by the processors 186 and 192 in FIG. 12.

In this embodiment, however, the data reader 210 and the user interface 212 are coupled to the processor 220 via a wireline connection 222. In one implementation, the data reader 210 and the user interface 212 are housed by a first housing, while the remaining components are housed by a second housing. This implementation is beneficial to allow use of the data reader 210 and the user interface 212 remotely from the second housing which is connected to the network access apparatus 22. In another implementation, all of the components are integrated into a single housing.

This system for communicating machine-readable data from a network navigation device to the network access apparatus 22 and/or the electronic network 20 can have any of the same forms described for the peripheral 172.

Figure 14:
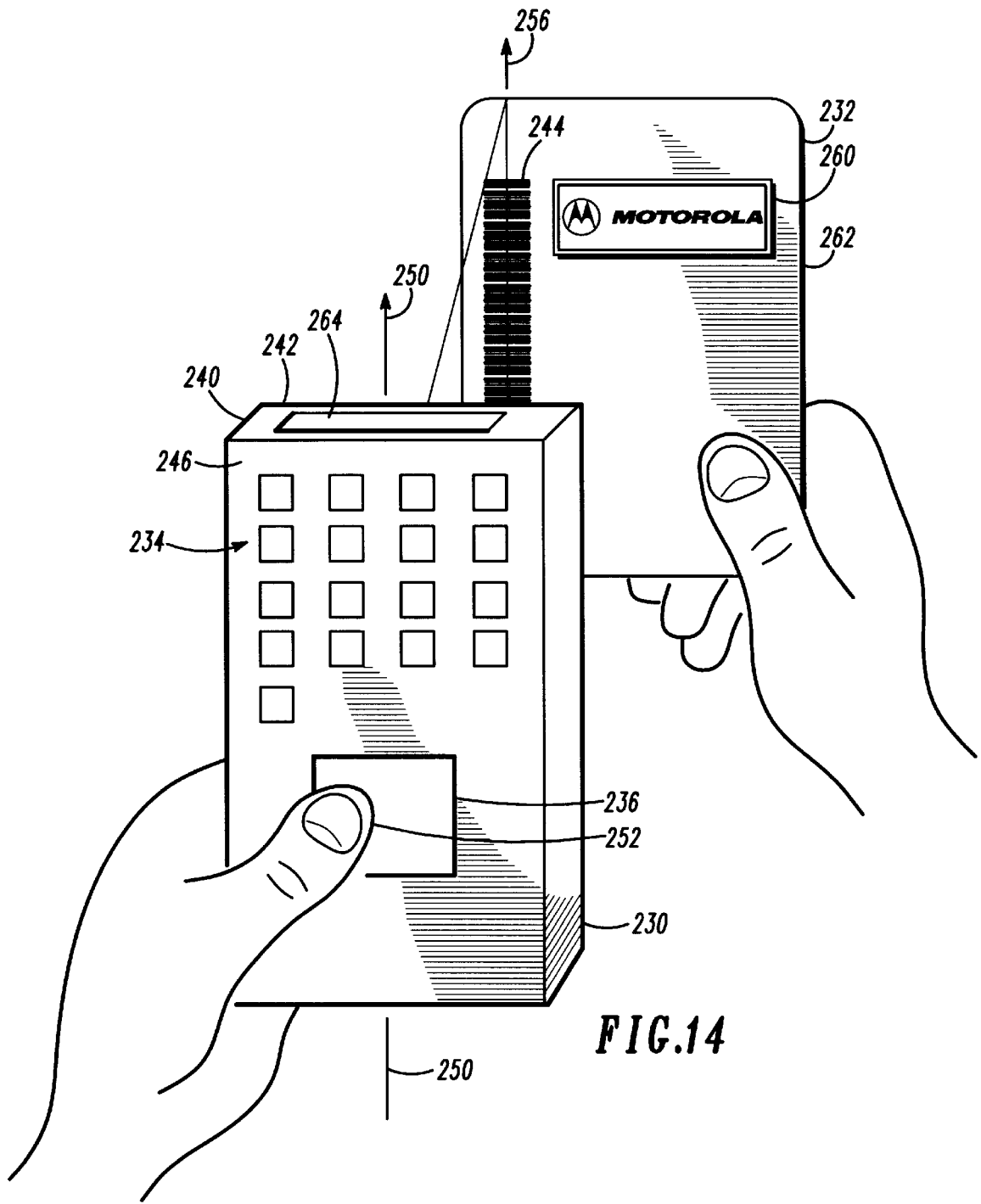
FIG. 14 is an illustration of an end user using an embodiment of an apparatus for reading a network navigation device.

FIG. 14 is an illustration of an end user using an embodiment of an apparatus 230 for reading a network navigation device 232. The apparatus 230 includes a user interface comprised of a keypad 234 and a touchpad 236. The keypad 234 is utilized for both network navigation functions and remote appliance control functions. The touchpad 236 is utilized as a pointing device for network navigation functions.

The apparatus 230 includes a housing 240 having a first face 242 from which a data reader (not specifically illustrated) reads machine-readable data 244 from the network navigation device 232. The housing 240 defines a second face 246 at which user-initiated actions are received by the user interface. In the embodiment illustrated in FIG. 14, the first face 242 and the second face 246 are defined by opposite sides of the housing 240.

The housing 240 defines a first axis 250 about which the housing 240 is grasped by the end user. Preferably, the touchpad 236 is located to receive a thumb 252 of the end user when the housing 240 is grasped. As a result, the end user can manipulate his/her thumb 252 to perform pointing and clicking actions with the touchpad 236 while grasping the housing 240.

The touchpad 236 is supported by a switching device (not specifically illustrated) to receive a user-initiated action for activating the data reader. Here, the end user activates the data reader by squeezing the apparatus 230 to apply a force to the touchpad 236 sufficient to depress the switching device. The end user de-activates the data reader by releasing the force applied to the touchpad 236 below a force threshold. By manipulating the touchpad 236 with a force below the force threshold, the end user can generate point and click actions without activating the data reader.

In the embodiment of FIG. 14, the data reader is mounted with respect to the housing 240 to generate a scanning light beam 254 along a second axis 256 substantially parallel to the first axis 250. The scanning light beam 254 is used to read bar-coded machine-readable data from the network navigation device 232.

This embodiment is well-suited for use with embodiments of network navigation devices described with reference to FIGS. 4 to 6. The network navigation device 232 illustrated in FIG. 14 is a two-sided card in accordance with FIGS. 5 and 6.

To link to a resource indicated by a human-viewable image 260, the end user grasps the network navigation device 232 from a side 262, and places the network navigation device 232 behind the apparatus 230. Next, the end user squeezes the touchpad 236 to activate the data reader. The data reader reads the machine-readable data 244 from the network navigation device 232. A signal representative of the machine-readable data 244 is communicated by a transmitter 264 to a peripheral (such as the peripheral 172 in FIG. 12). In this embodiment, the transmitter 264 includes an infrared transmitter, although other types of transmitters can be utilized. The peripheral selectively forwards portions of the machine-readable data 244 to a network access apparatus or an electronic network to link the network access apparatus to the resource associated with machine-readable data 244.

Thus, there has been described several embodiments including preferred embodiments of an apparatus for reading an electronic network navigation device and a peripheral for use therewith.

Because the various embodiments of the present invention utilize a device having a human-viewable image which is associated with a resource at an electronic address and machine-readable data for linking to the electronic address, they provide a significant improvement in that the addressing format and the address itself become more transparent to the end user. Consequently, the problem of address complexity is addressed using embodiments of the network navigation device. Further, the criticality of reserving desired domain names is reduced.

Additionally, the various embodiments of the present invention as herein-described provide an apparatus for reading network navigation devices to link to resources in an electronic network. By including both a data reader and a user interface, the apparatus is capable of both initiating a link to a resource and receiving user-initiated commands for navigating within the resource. The apparatus can communicate with or be included in a peripheral for the network access apparatus.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An apparatus for navigating an electronic network, the apparatus comprising:
    a data reader to read at least one instruction for navigating to a resource in the electronic network;
    a pointing device to receive a user-initiated action upon navigating to the resource, the user-initiated action for navigating within the resource;
    a transmitter to transmit a first signal associated with the at least one instruction and a second signal associated with the user-initiated action; and
    a housing which houses the data reader, the pointing device, and the transmitter.

2. The apparatus of claim 1 further comprising a switching device which supports the pointing device, wherein the data reader is activated responsive to the switching device.

3. The apparatus of claim 2 wherein the data reader is activated in response to a force applied to the pointing device.

4. The apparatus of claim 1 wherein the housing has a first face from which the data reader reads the at least one instruction, and a second face at which the user-initiated action is received by the pointing device.

5. The apparatus of claim 4 wherein the first face is opposite the second face.

6. The apparatus of claim 1 wherein the housing defines a first axis about which the housing is grasped by a user, and wherein the data reader scans a light beam along a second axis substantially parallel to the first axis.

7. The apparatus of claim 1 wherein the data reader includes a optical data reader.

8. The apparatus of claim 7 wherein the optical data reader includes a bar code reader.

9. The apparatus of claim 1 wherein the at least one instruction includes an electronic address for the resource.

10. The apparatus of claim 1 wherein the electronic network comprises the Internet.

11. The apparatus of claim 1 wherein the user-initiated action is for navigating within the resource using a graphical user interface.

12. The apparatus of claim 1 wherein the graphical user interface comprises a browser.

13. The apparatus of claim 1 wherein the at least one instruction comprises at least a portion of a uniform resource locator associated with the resource.

14. The apparatus of claim 1 wherein the at least one instruction comprises at least a portion of an internet protocol address associated with the resource.

15. The apparatus of claim 1 wherein the pointing device comprises at least one of a touchpad, a trackball, and a mouse.

16. An apparatus for navigating an electronic network, the apparatus comprising:
    a switching device;
    an optical data reader responsive to the switching device to read at least one instruction for navigating to a resource in the electronic network;
    a pointing device to receive a user-initiated action upon navigating to the resource, the user-initiated action for navigating within the resource using a graphical user interface;
    a transmitter to transmit a first signal associated with the at least one instruction and a second signal associated with the user-initiated action; and
    a housing which houses the switching device, the optical data reader, the pointing device, and the transmitter.

17. The apparatus of claim 16 wherein the electronic network comprises the Internet.

18. The apparatus of claim 16 wherein the graphical user interface comprises a browser.

19. The apparatus of claim 16 wherein the housing has a first face from which the optical data reader reads the at least one instruction and a second face at which the user-initiated action is received by the pointing device.

20. An apparatus for navigating the Internet, the apparatus comprising:
    a switching device;
    a bar code reader responsive to the switching device to read at least one bar-coded instruction for navigating to a resource of the Internet, the bar code reader scanning a light beam along a first axis to read the at least one bar-coded instruction;
    a pointing device supported by the switching device, the pointing device to receive a user-initiated action upon navigating to the resource, the user-initiated action for navigating within the resource using an Internet browser;
    a transmitter to transmit a first signal associated with the at least one bar-coded instruction and a second signal associated with the user-initiated action; and
    a housing which houses the switching device, the bar code reader, the pointing device, and the transmitter, the housing having a first face from which the bar code reader reads the at least one instruction and a second face at which user-initiated action is received by the pointing device, wherein the first face is opposite the second face, the housing defining a second axis about which the housing is grasped by a user, wherein the second axis is substantially parallel to the first axis.

* * * * *

UNITED STATES PATENT AND TRADEMARK OFFICE
CERTIFICATE OF CORRECTION

PATENT NO. : 5,938,726  
APPLICATION NO. : 08/732956  
DATED : August 17, 1999  
INVENTOR(S) : William L. Reber It is certified that error appears in the above-identified patent and that said Letters Patent is hereby corrected as shown below:

ON TITLE PAGE:

Please Insert:

-- Related U.S. Application Data:

(63)  Continuation-in-part of application No. 08/710,820, filed Sep. 23, 1996, now U.S. Pat. No. 5,940,595 and application No. 08/726,004, filed Oct. 4, 1996, now U.S. Pat. No. 5,995,105. --

Signed and Sealed this

Twentieth Day of March, 2007

JON W. DUDAS  
*Director of the United States Patent and Trademark Office*